Feb. 1, 1966 L. J. HAMILTON 3,232,325
PIVOT MEANS FOR CHAIN SAW BARS
Filed Dec. 23, 1963 3 Sheets-Sheet 1
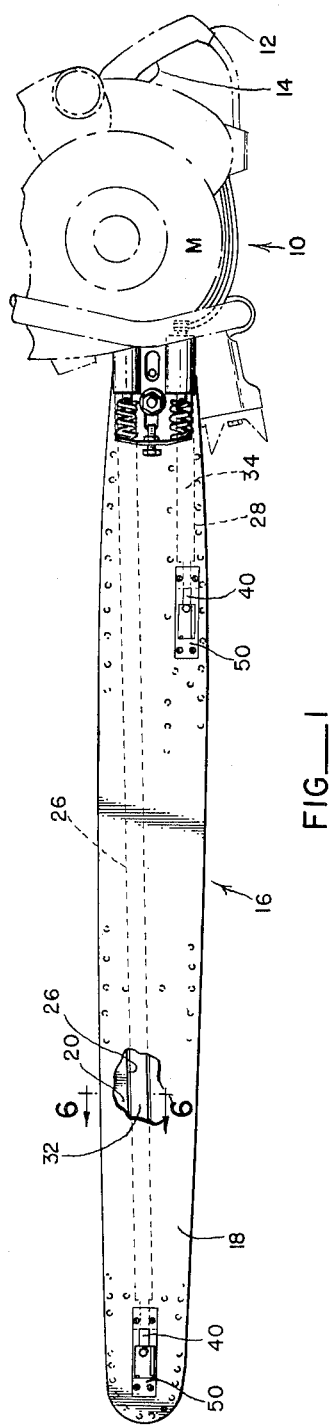
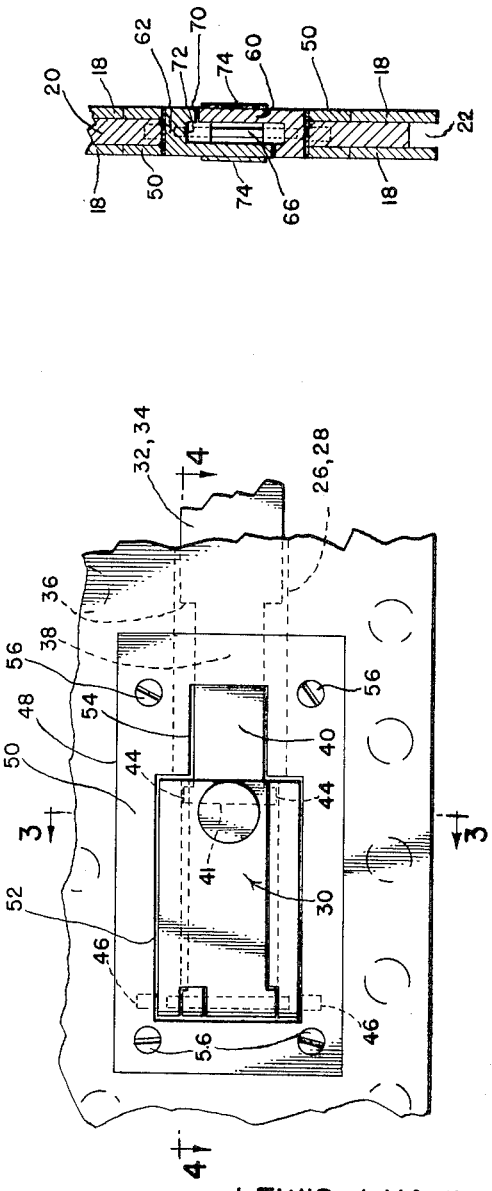
LEWIS J. HAMILTON
INVENTOR.
BY Tuck & Cole
ATTORNEYS Feb. 1, 1966     L. J. HAMILTON     3,232,325
PIVOT MEANS FOR CHAIN SAW BARS
Filed Dec. 23, 1963     3 Sheets-Sheet 2
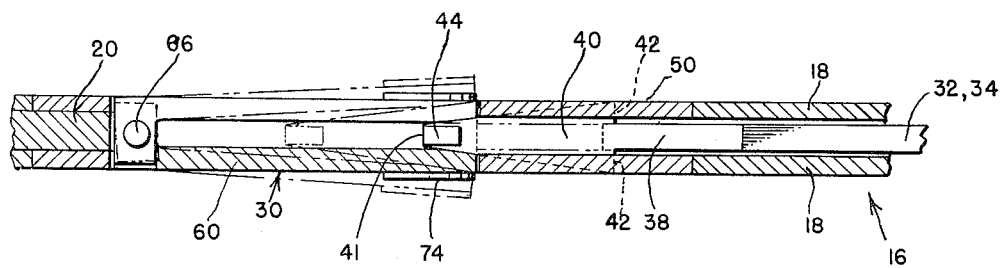
FIG._4
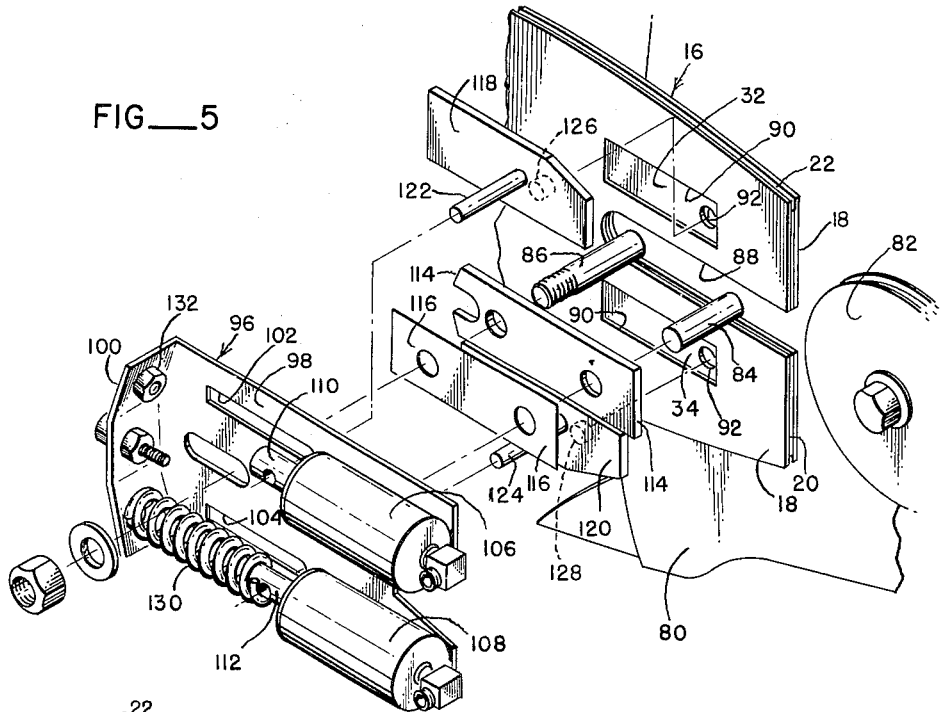
FIG._5
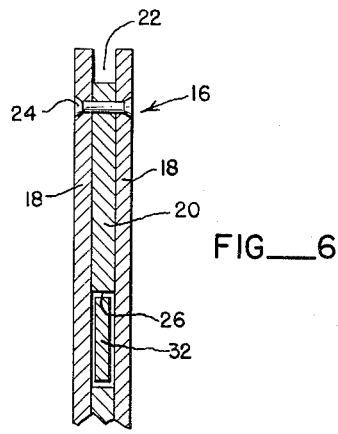
FIG._6
LEWIS J. HAMILTON
INVENTOR.
BY *Tuck & Cole*
ATTORNEYS Feb. 1, 1966 L. J. HAMILTON 3,232,325
PIVOT MEANS FOR CHAIN SAW BARS
Filed Dec. 23, 1963 3 Sheets-Sheet 3

LEWIS J. HAMILTON
INVENTOR.

BY Tuck & Cole
ATTORNEYS

United States Patent Office 3,232,325
Patented Feb. 1, 1966

3,232,325
PIVOT MEANS FOR CHAIN SAW BARS
Lewis J. Hamilton, 13244 SE. 30th, Bellevue, Wash.
Filed Dec. 23, 1963, Ser. No. 332,517
9 Claims. (Cl. 143—32)

This invention relates to a new and useful concept in the general field of saw bars for self-powered chain saws such as are used in the falling and cutting of timber and trees. More particularly does this invention relate to a new and useful chain saw bar which includes pivot means at its outer end and near its inner end to enable the operator or user to generate sufficient leverage for cutting through large cross sections of wood.

It has been a long recognized problem in the chain saw industry in general and in the logging industry in particular that the use of a chain saw to cut through large sections of wood requires a good deal of pressure applied to the saw in order to realize maximum cutting efficiency. This problem is particularly acute in logging where large trees must first be felled and bucked into logs so that the timber can be moved to the mills. All too often two men are required on a single saw because of the necessity for pressure on the end of the saw in order that the teeth on the high speed chain will cut with a minimum amount of effort by the operator and in the least amount of time. The use of two men, however, demands that holding means be attached to the outer end of the saw bar, thus restricting its usefulness. Full use is achieved many times in beginning a cut by first extending the saw longitudinally into the tree or log. Hence, either two saws must be utilized or time must be lost as the holding device at the outer end is removed and attached according to need. A one-man saw operation is tiring because of the prolonged application of pressure and also because of the weight of the saw itself. Furthermore, the use of two men results in an extravagant waste of manpower, adding to labor costs.

This invention is designed to overcome existing problems by providing a pivot means at the inner and at the outer end of the bar. In this way a single operator may actuate either one of the pivot means in order to apply leverage or pressure to the desired portion of the bar as the cutting operation dictates. In effect, the invention comprises movable dogs or expanders within the thickness dimensions of the bar. These expanders are located, as already noted, at the outer end of the bar and near its inner end. The expanders, which move outwardly against the sides of the particular cut, form pivots or fulcrums to allow pressure or leverage to be applied at the other end of the bar. The expanders can be activated by simple finger movements without moving the hands. The expanders are actuated by rods extending through or within the confines of the bar from the power unit to the expander elements. Pistons actuate the rods and the cylinders in turn are controlled by a unique but uncomplicated fluid pressure system mounted on the power unit. Manipulation of the fluid pressure system is accomplished by finger or thumb operated valves located conveniently to the operating handle of the power unit.

Accordingly it is a feature of this invention to provide pivot means for chain saw bars which permit the application of leverage about a point at either end of the bar.

Another feature of this invention is to supply pivot or fulcrum means for chain saw bars in which the pivot means can be selectively actuated by the operator's finger or thumb.

Still another feature of this invention is to supply pivot or fulcrum means for chain saw bars which are simple in design, rugged in construction, and economical in cost.

Yet another feature of this invention is to furnish unique pivot or fulcrum means for chain saw bars which eliminate costly duplication of equipment and reduce labor costs, and which also minimize the energy and effort required of a single man in any given cutting operation.

A further feature of this invention is to provide pivot or fulcrum means for chain saw bars which are positively actuated and which may be changed depending upon the wishes of the operator.

Other objects and advantages and features will be apparent in the details of construction and operation as more fully hereinafter described and claimed. Reference will be had to the accompanying drawings, forming a part of this disclosure, wherein like numerals refer to like parts throughout, and in which:

FIGURE 1 is a side elevational view of a typical chain saw and bar except that the chain has not been shown in order to eliminate unnecessary details;

FIGURE 2 is a side elevational view showing in greater detail the construction of the pivot means;

FIGURE 3 is an end elevation, partial cross-section view taken along the line 3—3 of FIG. 2 showing additional details of the pivot means;

FIGURE 4 is a partial plan view in cross section taken along the line 4—4 of FIG. 2 giving further details of the pivot means;

FIGURE 5 is an exploded or expanded view of the details of the components for expanding and retracting the pivot means;

FIGURE 6 is a partial elevational cross section view taken along the line 6—6 of FIG. 1 showing further details of the bar and expander rods;

Figures 7, 8, 9:
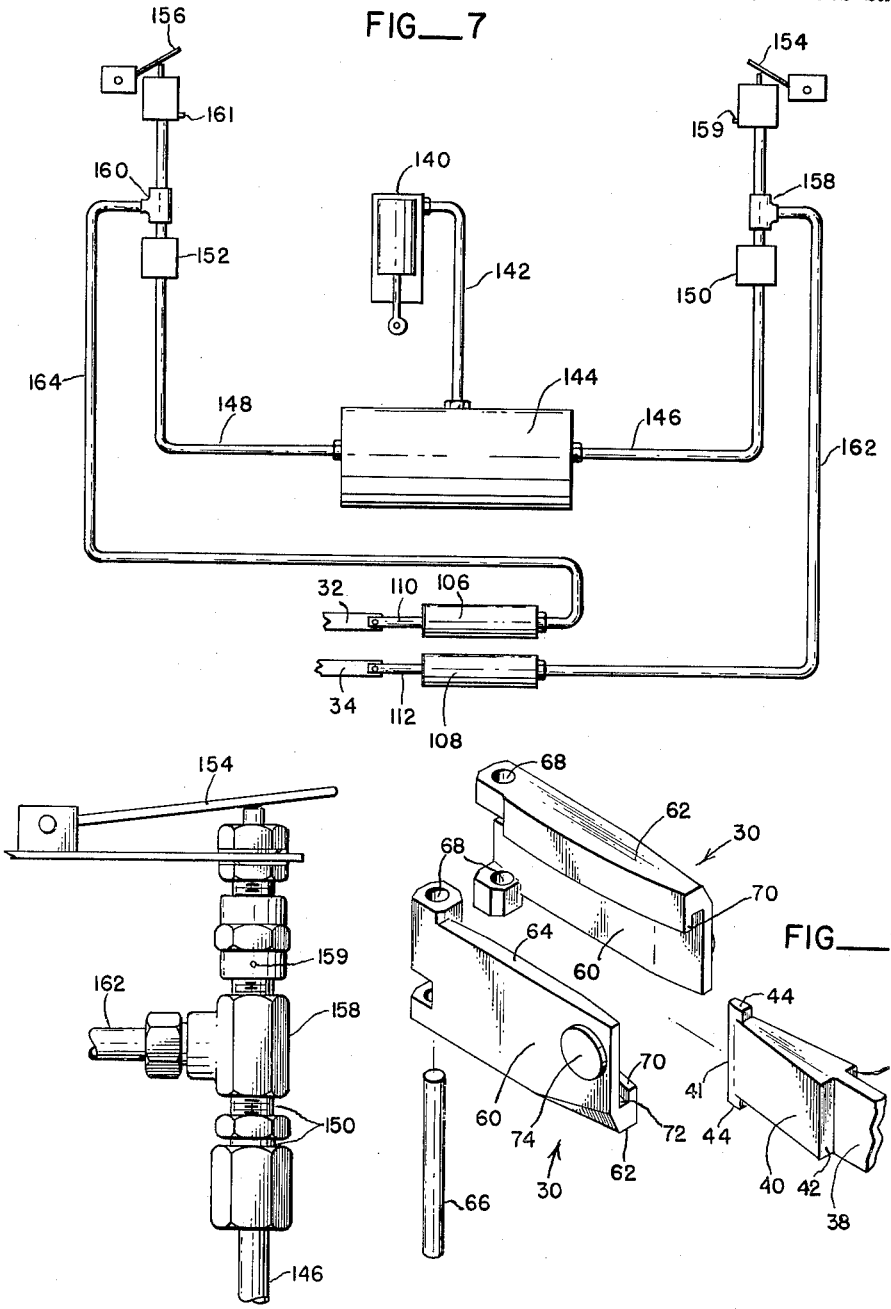
FIGURE 7 is a schematic diagram showing the general layout and organization of the finger controlled pressure system connected to the cylinders shown in FIG. 5 for actuating the pivots.
FIGURE 8 is a partial side elevational view of the valving features used for control of the pivot means.
FIGURE 9 is an expanded or exploded view of the pivot means and the outer ends of the expander rods.

Referring now to the drawings, especially FIGS. 1 to 6 and 9, it will be observed that the power unit, generally designated by the number 10, has motor M, control handle 12, and accelerator or speed control 14. The power unit, shown in phantom, merely completes the environment in which the invention is employed. The invention is adaptable to all makes and models of chain saws and bars, despite their differences in structure and appearance.

The bar itself, generally shown by the number 16, is preferably with three metallic laminations cut or formed from sheet metal material. The two outer laminations 18 are best made of steel while the center lamination 20 is most advantageously made of aluminum. The laminations may be secured together by any permanent means, such as welding, although it has been found most acceptable to rivet the laminations together. The three laminations form a conventional bar thickness or dimension, and the center lamination 20 is shaped so that when secured in position the chain track or groove 22 is provided. It is intended that conventional chains are to be used with this bar. While steel could be used for the center lamination 20 it has been found preferable to employ aluminum, primarily for two reasons. First, the heat conductivity coefficient of the aluminum aids in transferring heat away from localized hot spots which are occasionally encountered in the steel. Secondly, the lightness of the aluminum reduces the overall weight of the bar and the saw.

An elongated slot 26 is provided in the center lamination extending from the extreme inner end to the outer end of the bar. A shorter slot 28 is formed in the center lamination to accommodate an actuating rod for the pivot means which is located near the inner end. At the end of each of the slots 26 and 28, there is provided within the center lamination a rectangular opening, not numbered, which receives the dogs or expander elements referenced by the number 30 and which will be described more fully hereinafter. The longer slot 26 for the outer pivot contains actuating rod 32 while the shorter slot 28 accommodates rod 34. The rods 32 and 34 are long strips of metal extending from the actuating elements at the inner end of the bar to the particular pivot to which is connects. The outer end of each of the rods 32 and 34 will be reduced in depth as at 36 to form neck 28. The outer end of each of the two rods is formed in the shape of a wedge 40 which begins from a blunt point 41 and gradually tapers outwardly on both sides or faces for a short distance to form shoulders 42. As can be seen, particularly by reference to FIG. 9, the wedge is symmetrical in shape and the dimensions are such as to insure that the thickest dimension across the shoulders does not exceed the thickness of the bar. At the upper and lower edges of the point 41 are located the short actuating projections 44. The center lamination, in association with the opening at the end of each of the rod slots, also has small outwardly extending slots 46 at the extreme outer corners which receive the outer ends of pivot pins for expander elements to be described hereinafter.

The two outer laminations have formed therein the larger rectangular openings 48 for receiving retaining plates 50. The retaining plates can be seen by reference to FIG. 2 and are provided with openings 52 which in size are roughly equivalent to the openings in the center lamination. In addition, a slot 54 must be supplied in the retaining plate 50 to receive wedge 40. The retaining plate is detachably secured by screws 56 which thread into the retaining plate on the opposite side of the bar.

The expander elements 30, the details of which are best shown in FIGS. 2 to 4, 6 and 9, are positively expanded and retracted elements which form the pivot or fulcrum points for the saw bar. Said elements 30, sometimes referred to as dogs, are in effect generally L-shaped elements with legs which are substantially parallel with the sides or faces of the bar, and which are substantially longer than the other legs which are substantially shorter in order to confine within the thickness dimensions of the bar. Each element 30 has side wall 60 and guide wall 62. The elements are of a standard shape, design and construction so as to be used interchangeably. Said elements are of such dimensions as to fit into the opening 52 in mounting plate 50 and into the opening in the center lamination. The track or guide wall 62 on one element slidably abuts the free edge 64 of the opposite or matching element. The elements form an integral unit when joined together by appropriate pin means 66, and pivot freely around said pin by virtue of the pin receiving holes 68 at the ends of the elements away from the end where the wedge 40 is introduced.

Each expander element 30 has a short slightly curved guide flange 70 on its track or guide wall 62 which also is generally curved to coincide with the side wall 60. Thus, the actuating guide tracks or channels 72 are defined to receive projections 44 on wedge 40. As the projections 44 and wedge 40 move into channels 72 between the inner surfaces of walls 60 and into the space defined between the elements, said expander elements are forced outwardly by the wedge around pin 66. It will be appreciated by reference to FIG. 9 that a certain amount of outward curvature must be incorporated in the tracks and flange 70 in order that the wedge 40 will not contact the side walls 60 and thereby force the elements further apart than the projections will permit. Such curvature, which eliminates binding, prevents the rod from being twisted by wedge action. In effect, unless the curvature is present, the wedge and the projections will function in opposition to each other. The pin 66 is made long enough so that its ends extend outwardly beyond both elements 30 to be received in slots 46 in the center lamination opening. In this way the elements are held securely in position. Each of the elements at its end nearest the wedge, on the outside surface of the side wall 60 have contact areas 74 which represent the portion of the elements which contact the material being cut by the saw. As mentioned, the elements are of standardized dimensions so that they are freely interchangeable in a saw bar. It will be appreciated from the foregoing description that the elements are not only positively actuated outwardly by wedge 40 moving towards the pin 66, but that they are positively retracted by the projections 44 when the projections are moved away from the pin toward the open end of the pivot unit. Some play is allowed in the movement of the elements with respect to the projections and the wedge during expansion or retraction of the elements.

FIG. 5 shows a conventional bar mounting plate 80 which will be found on all power chain saws. Additionally, there are the chain drive sprocket 82 and the bar mounting studs 84 and 86, which are rigidly secured to the mounting plate 80. All bars, of course, are end slotted as at 88 to receive the mounting studs and to allow the bar to be moved inwardly or outwardly to adjust chain tension. The mounting end of the bar contains openings 90 for exposing the ends of the expander rods 32 and 34. Each rod 32 and 34 has a hole 92 to act as the means by which the rod may be moved in its respective slot. A cylinder mounting bracket, shown by the number 96, is designed to fit onto the mounting studs 84 and 86. In essence the cylinder mounting bracket comprises flat support portion 98 in the form of a plate with a wall 100 at the outer end thereof to act as the outer restraining means for cylinder springs. Main support portion 98 has slots 102 and 104 to permit motion from the cylinders to be transferred to the actuating or expander rods in the bar. Cylinders 106 and 108 have piston rods 110 and 112 each of which piston rods has a hole therein. Cylinder bracket 96 is mounted on bracket plate 114, which plate 114 together with shim 116 provides a firm support for the bracket 96. At the same time plate 114 leaves space on each side thereof between the bracket 96 and bar 16 to receive slide connector 118 for rod 32 and slide connector 120 for rod 34. Note that the slide connectors 118 and 120 have connector studs 122 and 124 for engaging the holes in piston rods 110 and 112 by extending through connector slots 102, and 104. On the back or bar side of slide connector 118 is a shorter actuating stud 126 engaging hole 92 in rod 32. Slide connector 120 has actuator stud 128 on its bar side for engaging hole 92 in rod 34. The actuator studs may be axially aligned with the connector studs if desired or if necessary. It will be understood that the slide connectors 118 and 120 must be of somewhat lesser thickness than the bracket plate and shim 114 and 116 together so as to permit unobstructed and unimpeded movement of the slide connectors between the bracket 96 and bar 16.

The cylinders as illustrated are one-way acting air driven devices which are provided with compression springs 130, the top one of which springs has been eliminated to more clearly show the details of the bracket 96. One end of the spring fits over the piston rod and is confined thereon by the connector stud 122 or 124 extending through the hole in the piston rod. The outer end of the compression spring is retained and generally held centered by the plate 100 and its centering devices 132. When pressure is introduced to the cylinder, the piston rod is moved outwardly against the spring pressure to move the actuator or expander rod. When pressure is exhausted from the cylinder the force of the spring returns the piston rod to its retracted position thus moving the actuator or expander rod to its back position. Those skilled in the art will readily devise other methods and ways of mounting the cylinders and connecting them to the rods in the bar. The means shown in FIG. 5 is merely for purposes of illustration and to complete a picture of the invention. Obviously the cylinders could be double acting if desired and achieve the necessary movement of the rods by simple and minor alterations in structure.

Compressed air may be provided by tapping lines or tubing into the motor cylinder 140 near the spark plug. Pressure may then be directed from the cylinder 140 via line 142 to a pressure storage tank 144. Since there will be separate actuating mechanism for each of the two pivot points, air is directed from storage tank 144 by lines 146 and 148 to and through operating or control valves 150 and 152. At such time as it is desired to deliver air to one of the cylinders the finger or thumb lever 154 or 156 may be depressed by the operator without moving his hand from the main control handle. Air then flows through the fittings 158 and 160 and follows a course through lines 162 and 164 to the respective cylinders. So long as the valves are left open by the depression of the finger levers pressure will be maintained in the cylinders and the rod or rods will be forced out to extend the expander elements. Means may and will be provided to lock the valves open so that continuous application of finger pressure is not necessary to the functioning of the pivots. As soon as the valves are closed, the air from the cylinders exhausts and the spring 130 returns the piston rod to its retracted position. The air exhausts in a reverse direction through lines 162 and 164 and is vented to atmosphere by the valving structure. While the valving structure is merely illustrative it will be noted that exhaust holes 159 and 161 are provided to release the air when a pivot point is released or retracted. Other control means will readily occur to those skilled in the art for accomplishing the same ends. One alternative example would be hand actuated levers with appropriate connecting mechanisms to the actuator or expander rods. However, most operators will not want to remove their hands from main control handle 12 to actuate pivots and thus it is considered preferable to provide more convenient actuating controls such as shown and described.

The bar itself while shown to be of laminated structure could be of solid construction in which the passages or channels for the actuating rods would be milled or formed into the sides of the bar to an appropriate depth. However, it has been found preferable to utilize the laminated structure.

The foregoing is considered as illustrative only of the principles of this invention. Numerous modifications and changes will occur to those skilled in the art and hence it is not desired to limit the invention to the precise construction and operation shown and described. Accordingly all suitable modifications and equivalents may be resorted to, falling within the scope of the invention.

What is claimed is:

1. Pivot means for chain saw bars, comprising: (a) a power and control unit having a saw bar and chain attached thereto, (b) at least one expandable and retractable pivot means in an opening in said bar, said pivot means comprising a pair of generally flat expander elements pivotally mounted together within said opening and within the dimensions of said bar, a movable actuator rod extending through said bar from said power unit to said pivot means, said rod positively engaging said expander elements to move said elements about said pivot mounting as said rod is moved, and (c) rod actuating means mounted on said power unit for moving said rod.

2. Pivot means for chain saw bars, comprising: (a) at least one expandable and retractable pivot means in an opening in said bar, said pivot means comprising a pair of generally flat coacting expander elements pivotally mounted together within said opening and within the thickness dimensions of said bar, (b) an actuator rod movable through a predetermined distance and extending through said bar from the mounting end of said bar to said pivot means, said rod positively engaging said expander elements to move said elements about their pivot mounting as said rod is moved and said rod being adapted to be actuated by means connected to the power unit to which the said bar is adapted to be attached.

3. Pivot means for chain saw bars, comprising: (a) at least one expandable and retractable pivot means in an opening in said bar, said pivot means comprising a pair of generally flat coacting expander elements pivotally mounted together within said opening and within the thickness dimensions of said bar, said elements having guide track means thereon, (b) an actuator rod movable through a predetermined distance and extending through said bar from the mounting end of said bar to said pivot means, said rod positively engaging said guide track means of said expander elements to move said elements about their pivot mounting as said rod is moved and said rod being adapted to be actuated by means connected to the power unit to which said bar is adapted to be attached.

4. Pivot means for chain saw bars, comprising: (a) at least one expandable and retractable pivot means mounted in an opening in said bar, said pivot means comprising a pair of generally flat, L-shaped coacting expander elements pivotally mounted together within said opening and within the thickness dimensions of said bar, each of said elements having a guide track thereon and said guide tracks being opposed to each other, (b) an actuator rod movable through a predetermined distance and extending through said bar from the mounting end of said bar to said pivot means, said rod having guide track projection means positively engaging said guide track on each of said elements to move said elements about their pivot mounting as said rod is moved and said rod being adapted to be actuated by means connected to the power unit to which said bar is adapted to be attached.

5. Pivot means for chain saw bars, comprising: (a) at least one expandable and retractable pivot means mounted in an opening in said bar, said pivot means comprising a pair of generally flat, L-shaped coacting expander elements pivotally mounted together within said opening and within the thickness dimensions of said bar, said elements defining a rod receiving space between them and each of said elements having a guide track thereon and said guide tracks being located at the top and bottom of said space and being opposed to each other, (b) an actuator rod movable through a predetermined distance and extending through said bar from the mounting end of said bar to said pivot means, said rod having guide track projection means positively engaging said guide track on each of said elements to move said elements about their pivot mounting as said rod is moved, and said rod being adapted to be actuated by means connected to the power unit to which said bar is adapted to be attached.

6. Pivot means for chain saw bars, comprising: (a) at least one expandable and retractable pivot means mounted in an opening in said bar, said pivot means including a pair of generally flat, L-shaped coacting expander elements pivotally mounted together on a common pivot pin within said opening and within the thickness dimensions of said bar, said elements defining a rod receiving space between them and each of said elements having a guide track thereon, and said guide tracks being located at the top and bottom of said space and being opposed to each other, (b) an actuator rod movable through a predetermined distance and extending through an elongated actuator rod slot in said bar from the mounting end of said bar to said pivot means, said rod having guide track projection means on the outer end thereof to be received in said space and positively engaging said guide track on each of said elements to move said elements about their pivot pin mounting as said rod is moved, and said rod being adapted to be actuated by means connected to the power unit to which said bar is adapted to be attached.

7. Pivot means for chain saw bars, comprising: (a) a power and control unit having a saw bar and chain attached thereto, (b) a pair of spaced apart expandable and retractable pivot means located in said bar, each of said pivot means being positioned near an end of said bar and comprising a pair of generally flat expander elements pivotally mounted together within said opening and within the dimensions of said bar, a pair of spaced apart movable actuator rods extending through said bar from said power unit to said pivot means, said rod positively engaging said expander elements to move said elements about said pivot mounting as said rod is moved, and (c) rod actuating means mounted on said power unit for moving said rods.

8. Pivot means for chain saw bars, comprising: (a) at least one expandable and retractable pivot means mounted in an opening in said bar, said pivot means comprising a pair of generally flat, L-shaped coacting expander elements pivotally mounted together within said opening and within the thickness dimensions of said bar, said elements defining a rod receiving space between them and each of said elements having a guide track thereon, said guide tracks being located on the top and bottom of said space and being opposed to each other, (b) an actuator rod movable through a predetermined distance and extending through said bar from the mounting end of said bar to said pivot means, said rod having a wedge and guide track projections on the outer end thereof positively engaging said elements and said guide tracks on said elements to move said elements about their pivot mounting as said rod is moved, and said rod being adapted to be actuated by means connected to the power unit to which said bar is adapted to be attached.

9. Pivot means for chain saw bars, comprising: (a) a pair of spaced apart expandable and retractable pivot means mounted in openings in said bar, each of said pivot means including a pair of generally flat, L-shaped coacting expander elements pivotally mounted together on a common pivot pin within said openings and within the thickness dimensions of said bar, said elements defining a rod receiving space between them and each of said elements having a guide track thereon, and said guide tracks being located at the top and bottom of said space and being opposed to each other, (b) a pair of spaced apart actuator rods movable through a predetermined distance and extending through a pair of spaced apart elongated actuator slots in said bar from the mounting end of said bar to said pivot means, said rods having wedge and guide track projection means on the outer end thereof to be received in said space and said projection means positively engaging said guide tracks on said elements to move said elements about their pivot pin mounting as said rod is moved, and said rods being adapted to be actuated by means connected to the power unit to which said bar is adapted to be attached.

References Cited by the Examiner
UNITED STATES PATENTS
3,101,103   8/1963   Ricci _____ 143—32

DONALD R. SCHRAN, *Primary Examiner.*

WILLIAM W. DYER, JR., *Examiner.*